US010174203B2

(12) United States Patent
Shimizu et al.

(10) Patent No.: US 10,174,203 B2
(45) Date of Patent: Jan. 8, 2019

(54) MAGNETIC PIGMENTS COMPRISING A FLAKY SUBSTRATE AND LAYER OF MAGHEMITE

(75) Inventors: Kaiman Shimizu, Iwaki (JP); Tamio Noguchi, Iwaki (JP); Fumiko Sasaki, Iwaki (JP); Yukitaka Watanabe, Iwaki (JP); Masahiko Yazawa, Iwaki (JP)

(73) Assignee: Merck Patent GmbH, Darmstadt (DE)

( * ) Notice: Subject to any disclaimer, the term of this patent is extended or adjusted under 35 U.S.C. 154(b) by 1550 days.

(21) Appl. No.: 13/380,156

(22) PCT Filed: Jun. 8, 2010

(86) PCT No.: PCT/EP2010/003430
§ 371 (c)(1),
(2), (4) Date: Dec. 22, 2011

(87) PCT Pub. No.: WO2010/149266
PCT Pub. Date: Dec. 29, 2010

(65) Prior Publication Data
US 2012/0091702 A1  Apr. 19, 2012

(30) Foreign Application Priority Data
Jun. 26, 2009  (EP) .................... 09008389

(51) Int. Cl.
*C09C 1/00* (2006.01)
*B42D 25/369* (2014.01)
*B42D 25/29* (2014.01)

(52) U.S. Cl.
CPC ............ *C09C 1/0021* (2013.01); *B42D 25/29* (2014.10); *B42D 25/369* (2014.10); *C09C 1/0015* (2013.01); *B42D 2033/16* (2013.01); *B42D 2033/20* (2013.01); *C01P 2002/52* (2013.01); *C01P 2006/42* (2013.01); *C01P 2006/62* (2013.01); *C01P 2006/63* (2013.01); *C01P 2006/64* (2013.01); *C01P 2006/65* (2013.01); *C09C 2200/1004* (2013.01); *C09C 2200/301* (2013.01); *C09C 2200/306* (2013.01)

(58) Field of Classification Search
CPC ........ B42D 15/00; B42D 15/10; B42D 25/00; B42D 25/30; B42D 25/351; B42D 25/369; B42D 25/373; B42D 25/378; B42D 25/45; B42D 25/29; B42D 2033/16; C09C 1/0021; C09C 1/0015; C09C 2200/1004; C09C 2200/306; C09C 2200/301; B01P 2006/63; C01P 2006/62; C01P 2002/52; C01P 2006/65; C01P 2006/64; C01P 2006/42

USPC ............ 283/72, 82, 83, 94, 95, 96, 98, 114; 252/62.3 R, 62.51 R, 62.52, 62.53, 62.54, 252/62.55, 62.56, 62.57, 62.58, 62.59, 252/62.51, 62.9 R; 428/357; 101/491
See application file for complete search history.

(56) References Cited

U.S. PATENT DOCUMENTS

| 3,926,659 | A | 12/1975 | Bernhard et al. |
| 4,495,164 | A | 1/1985 | Okuda et al. |
| 6,620,233 | B1 | 9/2003 | Seeger et al. |
| 2002/0118409 | A1* | 8/2002 | Stevenson ...................... 283/86 |
| 2003/0047115 | A1 | 3/2003 | Bauer et al. |
| 2004/0038355 | A1 | 2/2004 | Vogt et al. |
| 2004/0195823 | A1* | 10/2004 | Yokote ..................... B41M 3/14 283/72 |
| 2008/0141938 | A1* | 6/2008 | Chandran et al. ........ 118/723 E |
| 2009/0230670 | A1* | 9/2009 | Schmid .................. B42D 25/29 283/85 |
| 2009/0255442 | A1* | 10/2009 | Hollman et al. .............. 106/416 |
| 2010/0258769 | A1* | 10/2010 | Krietsch ............... C09C 1/0015 252/519.4 |

FOREIGN PATENT DOCUMENTS

| DE | 199 53 655 A1 | 5/2001 | |
| DE | 100 65 761 A1 | 7/2002 | |
| EP | 0 341 002 A2 | 11/1989 | |
| EP | 0422755 A1 * | 4/1991 | |
| EP | 422755 A1 * | 4/1991 | |
| EP | 0422755 A1 * | 4/1991 | ............. C01G 49/06 |
| EP | 0 655 486 A2 | 5/1995 | |
| EP | 0 686 675 A1 | 12/1995 | |
| EP | 0 763 573 A2 | 3/1997 | |
| EP | 1504923 A2 * | 2/2005 | ............. B42D 25/29 |
| WO | 93/08237 A1 | 4/1993 | |
| WO | WO 02/054417 A1 | 7/2002 | |
| WO | WO 2006061301 A1 * | 6/2006 | ............. B42D 25/29 |
| WO | WO 2009077122 A2 * | 6/2009 | ........... C09C 1/0015 |
| WO | WO 2009/126437 A1 | 10/2009 | |

OTHER PUBLICATIONS

International Search Report of PCT/EP2010/003430 (dated Aug. 12, 2010).
European Examination Report for corresponding European Patent Application No. 10 723 942.8; dated May 31, 2017.

* cited by examiner

*Primary Examiner* — Justin V Lewis
(74) *Attorney, Agent, or Firm* — Millen, White, Zelano & Branigan, PC

(57) ABSTRACT

Magnetic pigments containing a transparent flaky homogeneously composed substrate having two parallel major surfaces and a coating containing maghemite, a process for the production of said pigments as well as their use.

29 Claims, No Drawings

MAGNETIC PIGMENTS COMPRISING A FLAKY SUBSTRATE AND LAYER OF MAGHEMITE

The present invention relates to magnetic pigments comprising a transparent flaky homogeneously composed substrate having two parallel major surfaces and a coating comprising maghemite, to a process for the production of said pigments as well as to their use.

The magnetic pigments of the present invention are particular useful for decorative and security applications, where the magnetic properties of the pigments, in particular their ability to orient in a magnetic field, as well as their outstanding coloristic characteristics may be reasonably combined, but may also be used in other fields where either the magnetic properties or the coloristic properties of the pigments might be of interest.

Besides acicular magnetic pigments, which are preferably used in magnetic recording media, flaky magnetic pigments per se are known for a long time for diverse applications.

U.S. Pat. No. 3,926,659 discloses mica pigments which are optionally coated with $TiO_2$ or $ZrO_2$ or hydrates thereof, having a uniform iron containing layer thereon, which may be of gamma iron oxide (maghemite). In the latter case, the pigments are described to be useful in synthetic resins for the production of household magnets or storage magnets (magnetic recording media). The coloristic properties of these pigments are mostly due to the interference color produced by the $TiO_2$ or $ZrO_2$ layer, which is slightly shifted by the application of a gamma iron oxide layer thereon. Their body color is, depending on the layer thickness of the gamma iron oxide layer, from flesh colored to chocolate brown.

Pigments of this type do neither exhibit attractive coloristic properties nor sufficiently good magnetic properties in order to be usable in security applications, where outstanding effects in color as well as in magnetism are indispensable for the creation of striking security features.

In DE 100 65 761 A1 flaky magnetic particles are described, which are multilayered and contain a core comprising $Al_2O_3$ or a mixed phase of $Al_2O_2$ and $SiO_2$, an intermediate layer of amorphous $SiO_2$ and a shell containing iron, the latter may be, inter alia, of maghemite. These particles are coated with anorganic or organic coupling agents being able to react with nucleic acids or proteins for isolation thereof in aqueous solutions. Since these pigments are made of aluminum powders by suspension in water and adding water soluble silicatic compounds, the cores thereof are not of homogeneous composition, but of mixed oxides of aluminum and silicon instead, optionally with remainings of aluminum metal. In addition, since the core material decomposes at least partly, the platy shape of the particles and a smooth surface thereof may not be maintained in the resulting pigment. Furthermore, the control of the production process is difficult, since the reaction of aluminum powder in water is highly exothermic per se and since the following reaction with iron compounds is dangerous as well (thermite process).

The coloristic properties of these pigments are not described, neither is their use in security applications.

In EP 341 002 B1, thin film structures with optically variable characteristics are disclosed, which comprise a substrate and a multilayered thin film metal-dielectric interference coating thereon, wherein the metal-dielectric interference coating comprises a reflecting metallic layer being of a material having magnetic as well as reflecting properties, such a cobalt nickel alloy.

Pigments of a similar type, namely optically variable magnetic pigments, are also described in EP 686 675 B1. These pigments are of lamellar nonferromagnetic metallic substrates being coated with a first ferromagnetic layer, a second layer of silica, alumina or their hydrates, a third layer of metal or of a black metal oxide and optionally a fourth layer of a colorless or colored metal oxide.

The pigments described in the two latter documents may be used in security applications, leading to three-dimensional effects when oriented magnetically in different directions and exhibiting different colors depending on the observation angle (optically variable). They exhibit strong hiding properties due to the metallic layers incorporated therein.

Although most of the security applications known, in particular for bank notes, identity cards etc., request the properties mentioned above, there is also a need for smarter effects, allowing more transparency if required and exhibiting a valuable coloristic without striking optically variable properties. In particular a profound golden color is always regarded of value in most cultures and highly desirable in goods of value, e.g. bank notes and the like. The combination of such a golden color with a strong magnetic effect and the advantages thereof such as clearly visible three dimensional effects using merely one single pigment would be highly appreciated in the art.

Thus, the aim of the present invention is to provide a pigment exhibiting sufficiently strong magnetic properties in order to be easily oriented in magnetic fields leading to three dimensional effects, exhibiting a golden interference color similar to pure gold and also exhibiting a certain degree of transparency on one side in combination with a comfortable hiding power on the other side, an economic process for the production of these pigments as well as their use.

The object of the present invention is achieved by magnetic pigments comprising a transparent flaky homogeneously composed substrate having two parallel major surfaces and a coating comprising maghemite.

In addition, the object of the present invention is achieved by a process for the production of such magnetic pigments, comprising the following steps:

(a) dispersing particles being composed of transparent flaky homogeneously composed substrates having two parallel major surfaces, optionally being coated with at least one dielectric layer, in water,
(b) adjusting a pH of between 2 and 4 and keeping the pH constant,
(c) adding a water soluble iron compound while still keeping the pH constant,
(d) raising the pH to a value between 5.5 and 7.5,
(e) optionally adding an aqueous solution of an alkali earth compound while keeping the pH constant,
(f) optionally washing and filtering the resulting product and
(g) drying at a temperature between 100° C. and 250° C. for a time period between 1 and 10 hours or, alternatively,
(h) calcining at a temperature between 350° C. and 450° C. for a time period between 5 and 30 minutes.

Furthermore, the object of the present invention is also achieved by the use of said pigments for pigmenting inks, paints, varnishes, coating compositions, plastics, foils, paper, ceramics, glasses, cosmetic and pharmaceutic formulations, for laser marking and for pigmenting pigment preparations of diverse solvent contents.

The first object of the invention is achieved by providing magnetic pigments comprising a transparent flaky substrate which is of homogeneous composition and has two major surfaces lying parallel to each other, having a coating comprising maghemite thereon.

A flaky substrate in the sense of the invention is a particulate substrate having an upper surface and a lower surface which do, both, constitute the major surfaces of the particulate substrate and lying parallel to each other.

Parallel in the sense of the invention does not merely mean strictly parallel in a geometrical sense, but also substantially parallel in a sense that the major surfaces are smooth and planar and in that the angle of deviation in comparison to geometrically parallel surfaces is not larger than 15°. The extension of the major surfaces in length and width constitutes the largest dimension (particle size) of the flaky particles. The length difference between the major surfaces constitutes the thickness of the flaky substrates. In general, the thickness of the flaky substrates of the present invention is much smaller than the particle size thereof. Usually, the ratio between particle size and thickness (aspect ratio) of each single flaky substrate is at least 2 and preferably ≥20, but may also be 1000 or even larger, e.g. up to 20.000.

Transparent in the sense of the present invention are flaky substrates if they substantially transmit visible light, i.e. to at least 90% of the incoming visible radiation.

The substrates of the magnetic pigments according to the present invention are homogeneous in their composition, i.e. they are composed of the same material, either of a single compound or a mixture of compounds or a mixed oxide, at each location in the substrate. In particular, there is no gradient or particular zones of different materials within a single substrate particle.

Flaky substrate particles of the type described above are usually not available by using common natural substrate particles such a mica, talc or other phyllosilicates. The latter materials are composed of several layers which are layered one on top of each other in such a way that the outer surfaces of the material are not planar and smooth, but exhibiting steps inside the layer package. Thus, planar and extremely smooth surfaces might not be achieved with these materials.

In contrast, synthetically produced substrate materials, such as substrates of $Al_2O_3$, of $SiO_2$, of glass or of different borosilicates, may be produced by exactly controlling the thickness of the particles as well as the smoothness of the outer surfaces, and, at best, also by controlling the thickness variation of the particles and deviation of the particle sizes in the end. Therefore, substrates which are of a synthetically produced transparent material are preferred in the present invention.

The substrates of the pigments according to the present invention are preferably of $Al_2O_3$, of $Al_2O_3$ containing up to 5% by weight $TiO_2$, based on the weight of the substrate, of $SiO_2$, of $SiO_2$ containing up to 20% by weight silicon hydroxide, based on the weight of the substrate, of glass or of a borosilicate. In particular preferred are substrates of $Al_2O_3$ or of $Al_2O_3$ containing up to 5% by weight $TiO_2$, both referred to as aluminum dioxide flakes in the following. Flaky substrate particles of $SiO_2$ or of $SiO_2$ containing up to 20% of silicon hydroxide are referred to as silica flakes in the following.

The substrates employed for the pigments of the present invention have a mean thickness between 100 and 1000 nm, preferably between 150 and 500 nm and most preferred between 200 and 400 nm. The thickness deviation of the substrate particles is preferably not larger than 10% and may be controlled by the production process of the corresponding substrate particles.

The mean diameter of the substrate particles, which corresponds to the largest dimension of the substrate, i.e. the particle size, is usually between 5 and 200 µm, in particular between 5 and 150 µm and mostly preferred between 10 and 100 µm. A narrow particle size distribution is in particular of advantage. The particle size distribution may be controlled either by the milling process or by classification processes or by both.

Transparent substrates of the kind described above impart a higher chroma, a more vivid interference color and, astonishingly, also a higher magnetism to the magnetic pigments according to the present invention, when compared with magnetic pigments exhibiting a maghemite coating on, for example, a mica substrate.

The coating comprising maghemite (gamma iron oxide), referred to as maghemite coating in the following, may be a coating on merely one of the major surfaces of the transparent substrate, but does, preferably, encapsulate the transparent substrate in such a way that all of the outer surfaces of the transparent flaky substrate are coated with the maghemite coating. It goes without saying that the maghemite coating does not have to exhibit the same thickness at each single point of the substrate surface and that even there may be some smaller surface areas of the substrate which are not perfectly coated with the maghemite coating. Limitations of this kind are due to technical production aspects and do not harm the intention of the present invention. In general, the thickness of the maghemite coating in the magnetic pigments of the present invention is in the range of from 20 to 400 nm, preferably of from 30 to 300 nm and most preferred of from 50 to 200 nm.

The maghemite coating is preferably a single layer comprising maghemite. In a particular preferred embodiment of the present invention, the maghemite coating is a single layer containing merely a sole iron compound which is maghemite. Nevertheless, there are also embodiments of the present invention wherein the maghemite coating may, besides the maghemite, also comprise different iron compounds such as minor contents of magnetite ($Fe_3O_4$) or hematite (alpha iron oxide). The latter two may be present in the maghemite coating with a content of at most 25% by weight in sum, either as a single compound or in combination, based on the weight of the maghemite coating (layer).

In addition, it is preferred that the maghemite coating is doped with at least one alkaline earth metal oxide. The alkaline earth metal oxides which are appropriate for this purpose are oxides of Mg, Ca, Sr and Ba, or mixtures thereof. In particular preferred is a doping of MgO.

The alkaline earth metal oxides mentioned above, and in particular the MgO, are present in the maghemite coating with a content of preferably between 0.01 and less than 0.1% by weight, based on the weight of the maghemite coating. They do not form mixed oxides with the iron component, in particular, they do not form ferrites since their content is far to small. Instead, they are present as alkaline earth metal oxides per se, e.g. as MgO, in the maghemite coating. The doping of the alkaline earth metal oxide imparts to the magnetic pigments of the present invention an improved dispersibility, a better gloss, a clearer color and an improved stability to heat and weathering. Furthermore, the interference color of the pigments is surprisingly not only clearer, but a higher chroma may also be achieved in case an alkaline earth metal oxide is present as a doping in the maghemite coating when compared with magnetic pigments of the present invention not containing an alkaline earth metal oxide doping in the maghemite layer.

Thus, the embodiment of the present invention where the maghemite coating is doped with an alkaline earth metal oxide, is preferred. MgO as a alkaline earth metal oxide is particularly preferred.

Most preferred is the embodiment of the present invention where the substrate material of the magnetic pigment is an aluminum dioxide flake as defined above, having a single coating thereon encapsulating the substrate which is a maghemite coating containing solely maghemite as an iron component and MgO as an alkaline earth metal oxide doping and preferably no further ingredients.

In the latter case, the maghemite coating is located directly onto the substrate. Also for the other substrate flakes mentioned above which are different from aluminum dioxide flakes, this embodiment is preferred. Nevertheless, in order to adapt the coloristic properties of the magnetic pigments of the present invention and/or in order to improve the surface characteristics of the substrate particles and/or in order to improve the application properties of the pigments in different media, there may be further coatings (layers) employed. To this end, the transparent substrate flake may be coated with at least one dielectric coating prior to coating the substrate particle with the maghemite coating. In addition or alternatively thereto, the maghemite coating may also be overcoated by one or more dielectric coatings on top thereof.

As material for the dielectric coatings, dielectric metal oxide or metal hydrate coatings are generally used in the present invention. Although they might also be colored under certain circumstances, they are advantageously composed of colorless metal oxides or metal oxide hydrates or their mixtures, e.g. of oxides or hydrates of Ti, Zr, Zn, Sn, Ce, Si and Al, such as titanium dioxide, zirconium oxide, zinc oxide, tin oxide, cer oxide, silicon dioxide and aluminum dioxide or the hydrates thereof.

It goes without saying that in case the dielectric layer is directly located onto the substrate flake underneath the maghemite coating, the material used for the dielectric layer is not identical with the material used for the substrate (for silica flakes and aluminum dioxide flakes, respectively).

The thickness of these dielectric coatings which are employed in addition to the maghemite layer depends on the purpose they are used for. In case the interference color of the novel magnetic pigments has to be adapted to certain requests, the thickness of the dielectric layers is in most cases between 20 and 300 nm, since under these circumstances, they will act as an optically active layer per se, acting as interference layers as such. This is in particular achieved if layers of titanium dioxide, zirconium dioxide or zinc dioxide are employed. In case they are used for the improvement of the surface quality of the substrate particles or for the adaptation of the magnetic pigments to particular application media with respect to dispersebility, light fastness, etc. only, their thickness may also be smaller than 20 nm and in particular between 1 and 15 nm, preferably between 2 and 10 nm. In the latter case, the dielectric layers as such will not impart any interference to the whole pigment system, but will improve the properties of the maghemite layer or of the substrate only. Here, in particular layers of silicon dioxide, aluminum oxide, cer oxide and/or tin oxide are used. Of course, interference imparting layers as well as layers for the improvement of the application properties may be used together within one embodiment of the present invention.

In addition to or alternatively to inorganic dielectric layers as described above, thin coatings of organic materials, e.g. of different organic silanes, organic titanates, organic zirconates, may also be applied to the surface of the magnetic pigments of the present invention in order to improve their application abilities in different application media. Such coatings are known in the art of effect pigments and their application is, therefore, within the ordinary skill of the person skilled in the art.

Examples for the so called "after treatment" of effect pigments, either of organic or of anorganic nature, which may be employed in the present invention as described above, may be found in the following documents: EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805; the content thereof shall be enclosed in the present invention by reference.

Preferably, the visible color of the magnetic pigments of the present invention is golden, and most preferred, is a profound golden color similar to pure gold exhibiting none or almost none color flop (i.e. not being "optically variable") when viewed at different viewing angles. The visible color of the magnetic pigments of the present invention is the result of the interference color of the interference layer(s) in combination with the absorption color of the maghemite layer (maghemite coating). To this end, the thickness of the interference layer (or layers, if applicable) has to be adapted to the thickness of the transparent flaky substrate in such a way, that a golden interference is achieved. The most important interference layer is the maghemite coating, optionally in combination with different dielectric coatings as described above. In addition, the substrate particles, due to the materials used, their thickness and due to their planar, smooth and parallel surfaces, contribute to the interference of the whole pigment too. In particular, in case the mean thickness of the substrate particles is within the preferred range of from 150 to 500 nm as described above, the influence of the substrate particles is of particular importance. In case the thickness of the substrate particles and the thickness of the maghemite coating and, optionally, the thickness of other dielectric coatings, is chosen within the general ranges described above, it is within the ordinary skill of a person skilled in the art to chose the appropriate thicknesses in order to achieve a golden interference color. On the other side, the absorption color of the maghemite layer, which is between yellow and dark brown, depending on the thickness of the layer, has also to be taken into account. It is of great advantage for the resulting coloristic properties of the magnetic pigments of the present invention if the interference color of the pigment and the absorption color of the maghemite layer lay very close to each other, most preferred if both of them exhibit a golden hue. In that case, no significant color travel of the whole pigment may be seen, but the golden interference color and the golden absorption color of the magnetic pigment of the present invention will overlap to such an extent that a visible color of a profound golden hue is achieved which may not be copied by applying "golden" pigments of different compositions. In addition, the magnetic pigments of the present invention exhibit a high degree of transparency in combination with a sufficiently high hiding power in order to show clearly visible and striking color effects even when coated onto white substrate materials such a bank note paper and, in addition, very good magnetic properties as well.

A further object of the present invention is a process for the production of the magnetic pigments mentioned above which is reliable, economic and easily to control.

Thus, a process is found comprising the following steps:
(a) dispersing particles being composed of transparent flaky homogeneously composed substrates having two parallel major surfaces, optionally being coated with at least one dielectric layer, in water, (b) adjusting a pH value of between 2 and 4 and keeping the pH value constant,
(c) adding a water soluble iron compound while still keeping the pH value constant,
(d) raising the pH to a value between 5.5 and 7.5,
(e) optionally adding an aqueous solution of an alkaline earth metal compound while keeping the pH value constant,
(f) optionally washing and filtering the resulting product and
(g) drying at a temperature between 100° C. and 250° C. for a time period between 1 and 10 hours or, alternatively,
(h) calcining at a temperature between 350° C. and 450° C. for a time period between 5 and 30 minutes.

As transparent flaky substrates, preferably synthetically substrates are employed, which are composed of $Al_2O_3$, of $SiO_2$, of glass or of different borosilicates. In particular, aluminum dioxide flakes, silica flakes, glass flakes or flakes of different borosilicates are used, wherein aluminum dioxide flakes and silica flakes are defined as described above.

As already described earlier, these flakes may be produces with a good control of shape, thickness, thickness deviation, smoothness of the surfaces, planar surfaces and particle size distribution. The better these conditions may be met, the better the quality and reliability of the resulting pigments with respect to color and magnetism.

For example, the aluminum dioxide flakes mentioned above may be produced by a process described in EP 763 573 A2, which is preferred. These substrate flakes contain a small amount of titanium dioxide, making the following coating procedure with dielectric layers or with the maghemite coating easier. They are commercially available under the trade name Xirallic® from Merck KGaA, Germany. But also aluminum dioxide flakes such as $\alpha$-$Al_2O_3$ in the form of hexagonal flakes having a particle diameter greater than 10 μm and an aspect ratio (particle diameter/thickness) of 5-10, which are known from JP-A 111239/1982, $\alpha$-$Al_2O_3$ flakes having an average particle diameter of 0.5-3 μm, which are disclosed in JP-B-72572/1991, or aluminum oxide in the form of fine platy particles of a hexagonal crystal system, wherein the plane perpendicular to the c axis is grown into a plate, described in JP-A 39362/1992, would be useful as transparent substrate particles for the magnetic pigments of the present invention.

Silica flakes which may be used as transparent substrates for the production of the magnetic pigments of the present invention are for example described in WO 93/08237. Here, in particular silica flakes made of a silicatic precursor material without the addition of any soluble or insoluble coloring agents are preferred. They are preferably produced by coating the precursor material (such as sodium silicate or potassium silicate) on an endless belt, solidifying the film obtained after drying, treating the resulting solid film with acid, washing and finally separating the film from the belt, whereby the desired silica flakes are produced. Substrates of this type are available as pure silica flakes or, in case of having at least one dielectric coating thereon, under the trade name Colorstream® from Merck KGaA, Germany. Silica flakes of this type are preferably used in the present invention.

Transparent substrate flakes of glass and different borosilicates having the desired properties with respect to planar and smooth surfaces, relatively small thickness as described above, as well as small thickness and particle size deviation are also commercially available in the market.

The substrate particles as mentioned above may optionally be precoated with at least one dielectric layer. To this end, the procedures generally known in the art of pearlescent pigments and effect pigments may be employed. In particular, wet chemical coating procedures are preferred, and particularly preferred are wet chemical coating methods using anorganic starting materials, since these processes are easily to handle and to control, leading to encapsulated substrate particles per se.

In general, wet coating methods for coating the substrate particles with dielectric layers, in particular dielectric metal oxide or metal oxide hydrate layers, are performed as follows: The substrate particles are suspended in water, and one or more hydrolysable metal salts are added at a pH value which is appropriate for hydrolysis and is chosen such that the metal oxides or metal oxide hydrates are precipitated directly onto the platelets without any instances of secondary precipitation. The pH value is kept constant usually by simultaneous metered addition of a base and/or acid. Subsequently, the pigments are separated off, washed and dried and, if desired, calcined, it being possible to optimize the calcination temperature in respect to the particular coating present. In general, the calcination temperatures are between 250 and 1000° C., preferably between 350 and 900° C. If desired, following the application of individual coatings the pigments can be separated off, dried, and, if desired, calcined before being resuspended for the application of further layers by precipitation. In the process for the production of the magnetic pigments according to the present invention, the calcination step may also be completely omitted in case the dielectric layer(s) is/are applied to the substrate particles just before applying the maghemite layer thereto as well as in the case where the dielectric layer(s) is/are applied onto the maghemite coating.

For the sake of completeness, the coating of dielectric layers can also take place in a fluidized-bed reactor by means of gas-phase coating, in which it is possible, for example, to make appropriate use of the techniques proposed in EP 0 045 851 and EP 0 106 235 for preparing pearl lustre pigments. But the wet coating methods as described above are clearly preferred.

Using the wet chemical methods described above, for instance, the coating of the transparent substrate particles with a silicon dioxide layer may be accomplished with a procedure as described in the following: A potassium or sodium silicate solution is metered into a suspension of the material that is to be coated and heated to about 50-100° C. The pH value is held constant at about 6-9 by simultaneous addition of a dilute mineral acid, such as HCl, $HNO_3$ or $H_2SO_4$. As soon as the desired layer thickness of $SiO_2$ has been reached, the addition of the silicate solution is terminated. The batch is subsequently stirred for about 0.5 h.

For the application of a titanium dioxide layer, preference is given to the technique described in U.S. Pat. No. 3,553,001. An aqueous titanium salt solution is added slowly to a suspension of the material that is to be coated, heated to about 50-100° C., and a substantially constant pH value of about 0.5-5 is maintained by simultaneous metered addition of a base, for example aqueous ammonia solution or aqueous alkali metal hydroxide solution. As soon as the desired thickness of the $TiO_2$ precipitate has been reached, addition of both titanium salt solution and base is terminated.

This technique, also referred to as the titration process, is notable for the fact that it avoids an excess of titanium salt. This is achieved by supplying to the hydrolysis only that quantity per unit time which is necessary for uniform coating with the hydrated $TiO_2$ and which can be received per unit time by the available surface area of the particles to be coated. There is therefore no production of hydrated titanium dioxide particles not precipitated on the surface to be coated.

Processes for the wet chemical coating of flaky substrate particles for the production of pearlescent pigments are for example described in the following documents: DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602 and DE 32 35 017.

For the coating of the transparent substrate particles mentioned above, either precoated or not, with a maghemite layer, the following procedure is preferably applied:

The substrate particles are suspended in water. Preferably, the suspension is heated to a temperature of from 75° C. to 85° C. The pH value of the resulting suspension is adjusted by adding an acid to the aqueous suspension to a value of between 2 and 4, and is kept constant. Thereafter, a soluble iron compound is slowly metered into the suspension while still keeping the pH value constant. After the addition of the soluble iron compound is completed, the pH is raised to a value between 5.5 and 7.5, preferably to a value between 6.5 and 7.5, in case an alkaline earth metal oxide should be incorporated into the maghemite layer. To this end, an aqueous solution of an alkaline earth metal compound is slowly metered into the suspension while keeping the pH value constant, the suspension is preferably kept under stirring for another 0.5 hours, then optionally filtered and washed. Advantageously, the addition of the alkaline earth metal compound is combined with the further addition of at least one water soluble iron compound, in particular of an iron(II) compound. Preferably, an iron(II)compound as well as an iron(III)compound are added simultaneously with the alkaline earth metal compound. The resulting pigment is separated off and dried, either at a moderate temperature between 100° C. and 250° C. for a time period between 1 hour and 10 hours, or, alternatively, at a temperature between 350° C. and 450° C. for a short time period between 5 and 30 minutes. Optionally, the resulting pigments may be classified in order to limit the particle size distribution thereof.

The process described above is preferably executed in an inert gas atmosphere, for example using nitrogen, argon or the like.

Furthermore, as already described above, it is of advantage if the alkaline earth metal compound, in case it is employed, is applied to the substrate to be coated while simultaneously metering a further water soluble iron compound to the suspension. In the latter case, the water soluble iron compound which is added in the very first step is advantageously an iron (III) compound, for example $Fe(NO_3)_3$, whereas the water soluble iron compound which is employed in addition to the soluble alkali earth metal compound comprises at least an iron (II) compound, for example $FeSO_4*7$ $H_2O$ and may, optionally, also comprise an iron(III)compound such as $Fe(NO_3)_3$.

In general, the following water soluble iron compounds may be used: $FeSO_4$, $FeCl_2$, $Fe(NH_4)_2(SO_4)_2$, $Fe(NO_3)_2$, $Fe_2(SO_4)_3$, $FeCl_3$, $FeNH_4(SO_4)_2$ or $Fe(NO_3)_3$; $FeSO_4$ and $Fe(NO_3)_3$ being particularly preferred.

As alkaline earth metal compounds, water soluble compounds of Mg, Ca, Sr, Ba or mixtures thereof may be used. The kind of alkaline earth metal salts is not particularly limited. Preferably, the sulfates, nitrates, hydroxides and halogenides may be used, as long as they are water soluble. Preferred alkaline earth metal compounds include $MgSO_4$, $Mg(NO_3)_3$, $MgCl_2$, $MgBr_2$, $MgI_2$, $Mg(OH)_2$, $CaCl_2$, $CaBr_2$, $Ca(OH)_2$ and $CaI_2$.

Since MgO is the most preferred alkaline earth metal oxide for the doping of the maghemite layer, the magnesium compounds mentioned above are mostly preferred, in particular $MgSO_4$.

The content of the alkaline earth metal oxide in the maghemite coating is very small, usually 1% by weight or less, preferably between 0.01 and less than 0.1% by weight, based on the weight of the maghemite layer.

Such a tiny content of an alkaline earth metal oxide does not lead to the formation of mixed oxides within the maghemite layer, but instead, a doped maghemite layer with the alkaline earth metal oxide, in particular with MgO, will be the result of the process.

As already described earlier, the doping does not only impart a better dispersibility, gloss, clearer interference color or improved stability to heat and weathering to the magnetic pigments of the present invention, but does also improve the chroma of the resulting pigments which could rather not be expected.

In case the substrate material and the maghemite coating are adapted to each other to exhibit a golden interference color and a yellow-to-golden absorption color which is very similar thereto in the way as described above, a very attractive colored pigment exhibiting no or merely a slight color flop, a pure visible golden color under each viewing angle, a high chroma and a sufficiently high hiding power in order to be clearly visible when coated onto a white surface may be achieved. These very attractive color characteristics are, in addition, accompanied by a very good magnetic behavior, allowing the orientation of the magnetic pigments of the present invention in magnetic fields in order to achieve three-dimensional designs. Furthermore, at least the coloristic properties may be further improved by doping the maghemite coating by alkaline earth metal oxides.

The magnetic pigments of the present invention having the characteristics mentioned above, lend themselves to the use in sophisticated objects of value.

Therefore, it is one object of the present invention to use the magnetic pigments according to the present invention for pigmenting inks, paints, varnishes, coating compositions, plastics, foils, paper, ceramics, glasses, cosmetic and pharmaceutic formulations, for laser marking and for pigmenting pigment preparations of diverse solvent contents.

Since the most common method of application of pigment containing media, in particular with respect to security applications, is in printing inks, it is preferred to use the present magnetic pigments in printing inks. These may include, depending on the actual particle size of the magnetic pigments, all kinds of printing inks which are usually used in printing operations, including screen printing inks, gravure printing inks such as intaglio printing inks, offset printing inks, flexographic printing inks as well as ink jet printing inks, to name only a few.

A further object of the present invention is also a product containing the magnetic pigments of the present invention. In general, the pigments of the present invention may be applied to any product which can take advantage of one of the characteristics of the present pigments, i.e. their coloristic or their magnetic properties, or both.

In particular, the pigments of the present invention may be used with high advantage in decorative and security products, since their outstanding characteristics are very desirable in both areas.

Security products in the sense of the present invention are for example bank notes, cheques, passports, identification documents, smart cards, drivers licenses, share certificates, bonds, cheque cards, tax banderols, postage stamps, tickets, credit cards, debit cards, telephone cards, lottery tickets, gift vouchers, packing materials, decorative materials, brand products or any other product which has to be secured.

It goes without saying that the magnetic pigments according to the present invention may be used in admixture with organic as well as inorganic colorants and pigments and, in particular, with effect pigments of any kind. Organic pigments and colorants are, for example monoazo pigments, disazo pigments, polycyclic pigments, cationic, anionic or nonionic colorants. Anorganic colorants and pigments are, for example white pigments, colored pigments, black pigments or effect pigments. Examples for appropriate effect pigments are metal effect pigments, pearlescent pigments or interference pigments, which are in general based on singly or multiply coated platelets of mica, glass, $Al_2O_3$, $Fe_2O_3$, $SiO_2$, etc. Examples for the structure and particular characteristics of these pigments are disclosed, inter alia, in RD 471001 or RD 472005, the disclosure thereof shall be included in the present specification by reference.

In addition, further colorants which may be used in admixture with the present magnetic pigments are luminescent colorants and/or pigments of any type as well as holographical pigments or LCPs (pigments on the basis of liquid crystal polymers). The magnetic pigments according to the present invention may be used in any desired mixing ratio with commonly used and commercially available pigments and fillers. Limitations for the use of the present pigments with other pigments and colorants are merely set in case that any mixture would disturb or limit the magnetic or coloristic properties of the pigments according to the present invention to a great extent.

The present invention is described in more detail in the following examples, but should not be limited to these.

EXAMPLE 1

100 g of an aluminum dioxide flake ($Al_2O_3$ with minor content of $TiO_2$, mean thickness 220 nm, mean particle diameter 18 μm) is suspended in deionized water. The suspension is heated to 80° C. while stirring. Nitrogen gas is slowly added into the reaction vessel. The pH value is adjusted and kept constant to 3.0 by metering an acidic compound into the suspension (HCl, about 15 wt. %). While still keeping the pH value constant, a $Fe(NO_3)_3$ solution (5.65 g of $Fe(NO_3)_3 * 9 H_2O$ in 100 ml deionized water) is added to the suspension. The pH value is raised to about 7.0 by adding a basic composition (NaOH, about 30 wt. %) to the suspension. While keeping the pH value constant, an aqueous solution of a Mg component and at least a Fe component (243 g $FeSO_4 * 7 H_2O$, 108 g $MgSO_4 * 7 H_2O$ and 16 g $Fe(NO_3)_3 * 9 H_2O$, in 1000 ml deionized water) is slowly metered into the suspension which is then kept for another 30 minutes while stirring. The resulting pigments are separated off by filtering, washed with deionized water and dried for about 4 hours at 200° C. in an oven.

The resulting pigment exhibits a strong golden color with vivid lustre and high magnetism. The structure of the iron oxide layer on the substrate was confirmed to be gamma iron oxide (maghemite) by powder X-ray diffraction and thermal analysis (TG/DTA).

EXAMPLE 2

The procedure of example 1 is repeated except that $MgSO_4 * 7 H_2O$ is not added to the suspension.

The resulting pigment exhibits a golden lustreous color and very good magnetic properties.

COMPARATIVE EXAMPLE 1

The procedure of example 1 is repeated except that mica (mean particle diameter 20 μm, mean thickness 450 nm) is used instead of the aluminum dioxide flake as transparent substrate.

The resulting pigment exhibits a yellowish color with low chroma and a weak magnetism.

Measurement of Coloristic Properties:

0.5 g of each of the pigments received in examples 1 and 2 as well as in comparative example 1 are mixed into 9.5 g of a standard NC-Acrylate lacquer (available from Merck KGaA per catalogue). The resulting mixture is coated by means of a bar coater onto usual black/white paper strips and dried.

The coloristic properties of the samples are measured on the black precoated areas of the paper strips using a Minolta CR-300 apparatus (product of Konica Minolta Holdings, Inc.). The coloristic results are as follows:

TABLE 1

| Sample | L | a | b | C |
|---|---|---|---|---|
| Example 1 | 53.7 | −7.22 | 32.34 | 33.13 |
| Example 2 | 51.69 | −5.76 | 29.67 | 30.22 |
| Comp. Example 1 | 41.87 | −1.57 | 12.97 | 13.08 |

From the results in Table 1 it is clearly detectable that the pigments according to example 1, having a doping of MgO within the maghemite layer, exhibit a very strong golden color with high lustre and high chroma. The coloristic results of the pigments according to example 2 are somewhat lower in each instance when compared to example 1, but still sufficient in order to show a distinct and vivid golden interference color with good chroma. In contrast, the sample of comparative example 1 does merely exhibit a weak yellowish color with low chroma and lustre.

Measurement of Magnetic Properties:

The magnetic properties of the samples resulting from examples 1, 2 and comparative example 1 were measured using a vibration magnetometer (Model VSM-5, product of Toei Industry Co., Ltd.) and the standardized procedure (in a 10 kOe magnetic field at room temperature).

The corresponding results are as follows:

TABLE 2

| Sample | Substr. | Doping | $M_s$ emu/g | $M_r$ emu/g | Hc Oe | SR Ms/Mr |
|---|---|---|---|---|---|---|
| ex. 1 | alumina | MgO | 28.74 | 14.51 | 334 | 0.5048 |
| ex. 2 | alumina | none | 29.16 | 14.78 | 349 | 0.5069 |
| comp. ex. 1 | mica | MgO | 21.65 | 8.62 | 148 | 0.3083 |

$M_s$ Saturation magnetization
$M_r$ Residual magnetization
Hc Coercive force
SR Ms/Mr The results as shown in Table 2 exhibit absolutely comparable magnetic properties of the sample according to example 1 in comparison to the sample according to example 2, whereas the magnetic behavior of the mica based magnetic pigments according to comparative example 1 are much weaker than those of the alumina based magnetic pigments according to the present invention.

The invention claimed is:

1. Magnetic pigments, comprising a substrate and a coating encapsulating the substrate wherein the substrate is a transparent flaky homogeneously composed substrate having two parallel major surfaces and wherein the coating comprises maghemite, wherein the maghemite coating is doped with at least one alkaline earth metal oxide.

2. Magnetic pigments according to claim 1, wherein the substrate is of a synthetically produced material.

3. Magnetic pigments according to claim 1, wherein the substrate is of $Al_2O_3$, of $Al_2O_3$ containing up to 5% by weight $TiO_2$, of $SiO_2$, of $SiO_2$ containing up to 20% by weight silicon hydroxide, of glass or of a borosilicate.

4. Magnetic pigments according to claim 1, wherein the substrate has a mean thickness between 100 nm and 1000 nm.

5. Magnetic pigments according to claim 1, wherein the maghemite coating is located directly onto the substrate.

6. Magnetic pigments according to claim 1, wherein there is at least one dielectric coating located between the substrate and the maghemite coating.

7. Magnetic pigments according to claim 5, comprising furthermore one or more dielectric coatings on top of the maghemite coating.

8. Magnetic pigments according to claim 1, wherein the alkaline earth metal oxide is chosen from the group of oxides of Mg, Ca, Sr and Ba or mixtures thereof.

9. Magnetic pigments according to claim 1, wherein the alkaline earth metal oxide is MgO.

10. Magnetic pigments according to claim 1, wherein the content of the alkaline earth metal oxide is between 0.01 and less than 0.1% by weight, based on the weight of the maghemite coating.

11. Magnetic pigments according to claim 1, exhibiting a golden interference color.

12. Process for the production of pigments according to claim 1, comprising:
 (a) dispersing particles being composed of transparent flaky homogeneously composed substrates having two parallel major surfaces, optionally being coated with at least one dielectric layer, in water,
 (b) adjusting a pH value of between 2 and 4 and keeping the pH value constant,
 (c) adding a water soluble iron compound while still keeping the pH value constant,
 (d) raising the pH to a value between 5.5 and 7.5,
 (e) adding an aqueous solution of an alkaline earth metal compound while keeping the pH value constant,
 (f) optionally washing and filtering the resulting product and
 (g) drying at a temperature between 100° C. and 250° C. for a time period between 1 and 10 hours or, alternatively,
 calcining at a temperature between 350° C. and 450° C. for a time period between 5 and 30 minutes.

13. Process according to claim 12 which is executed in an inert gas atmosphere.

14. Process according to claim 12, wherein the alkaline earth metal compound in step (e) is added while simultaneously adding a further water soluble iron compound.

15. Process according to claim 12, wherein the iron compound added in step (c) is a iron (III) compound and the iron compound added in step (e) comprises at least an iron (II) compound.

16. Process according to claim 12, wherein the alkaline earth metal compound is a magnesium compound.

17. A composition for pigmenting inks, paints, varnishes, coating compositions, plastics, foils, paper, ceramics, glasses, cosmetic and pharmaceutic formulations, for laser marking and for pigmenting pigment preparations of diverse solvent contents comprising a pigment of claim 1.

18. Composition according to claim 17, wherein the ink is a printing ink.

19. Product, comprising a pigment according to claim 1.

20. Product according to claim 19, which is a security product.

21. Security product according to claim 20, which is a bank note, a cheque, a passport, an identification document, a smart card, a drivers license, a share certificate, a bond, a cheque card, a tax banderol, a postage stamp, a ticket, a credit card, a debit card, a telephone card, a lottery ticket, a gift voucher, a packing material, a decorative material, a brand product or any other product which has to be secured.

22. Magnetic pigments according to claim 1, wherein there is no gradient or particular zones of different materials within a single substrate particle.

23. Magnetic pigments, comprising a transparent flaky homogeneously composed substrate having two parallel major surfaces and a coating comprising maghemite, wherein the substrate is of $Al_2O_3$, of $Al_2O_3$ containing up to 5% by weight $TiO_2$, $SiO_2$, $SiO_2$ containing up to 20% by weight silicon hydroxide, glass or a borosilicate, and wherein the maghemite coating is a single layer containing maghemite as sole iron compound and is located directly on the substrate.

24. Magnetic pigments according to claim 23, comprising furthermore one or more dielectric coatings on top of the maghemite coating.

25. Magnetic pigments according to claim 23, wherein the maghemite coating is doped with at least one alkaline earth metal oxide.

26. Magnetic pigments according to claim 25, wherein the alkaline earth metal oxide is an oxide of Mg, Ca, Sr, Ba or mixtures thereof.

27. Magnetic pigments according to claim 26, wherein the alkaline earth metal oxide is MgO.

28. A process for the production of pigments according to claim 23, comprising:
 (a) dispersing in water particles being composed of transparent flaky homogeneously composed substrates having two parallel major surfaces, wherein the substrate is $Al_2O_3$, $Al_2O_3$ containing up to 5% by weight of $TiO_2$, $SiO_2$, $SiO_2$ containing up to 20% by weight silicon hydroxide, glass or a borosilicate,
 (b) adjusting a pH value of between 2 and 4 and keeping the pH value constant,
 (c) adding a water soluble iron compound while still keeping the pH value constant,
 (d) raising the pH to a value between 5.5 and 7.5,
 (e) optionally adding an aqueous solution of an alkaline earth metal compound while keeping the pH value constant,
 (h) optionally washing and filtering the resulting product and
 (i) drying at a temperature between 100° C. and 250° C. for a time period between 1 and 10 hours or, alternatively,
 calcining at a temperature between 350° C. and 450° C. for a time period between 5 and 30 minutes.

29. A composition for pigmenting inks, paints, varnishes, coating compositions, plastics, foils, paper, ceramics, glasses, cosmetic and pharmaceutic formulations, for laser marking and for pigmenting pigment preparations of diverse solvent contents comprising a pigment of claim 23.

* * * * *